United States Patent [19]

Escande

[11] 4,196,527

[45] Apr. 8, 1980

[54] DRYING APPARATUS

[76] Inventor: Henri Escande, "Favol" Bias, 47300 Villeneuve-sur-Lot, France

[21] Appl. No.: 936,605

[22] Filed: Aug. 23, 1978

[30] Foreign Application Priority Data

Aug. 24, 1978 [FR] France ................................ 78 26274

[51] Int. Cl.[2] ................................................ G01B 5/20

[52] U.S. Cl. ........................................ 34/203; 34/207; 34/236; 198/603

[58] Field of Search ................. 34/201, 203, 205, 207, 34/236; 198/603; 432/239

[56] References Cited

U.S. PATENT DOCUMENTS

| | | | |
|---|---|---|---|
| 640,319 | 1/1900 | Perkins | 34/205 |
| 845,317 | 2/1907 | Reatz | 34/205 X |
| 2,074,458 | 3/1937 | Cavagmaro | 34/203 X |

FOREIGN PATENT DOCUMENTS

| | | | |
|---|---|---|---|
| 666892 | 11/1938 | Fed. Rep. of Germany | 34/203 |
| 1110007 | 2/1956 | France | 34/205 |

*Primary Examiner*—Edward G. Favors

*Attorney, Agent, or Firm*—Young & Thompson

[57] ABSTRACT

A drying oven comprises a plurality of superposed endless belt conveyers that feed each to the next lower conveyer. The upper two conveyers are separately fed from individual hoopers; and the third conveyer receives all the material from the upper two. In this way, fruits and vegetables of different sizes can be given different drying times, by running the two upper conveyers at different speeds. A plurality of superposed blowers with selectively adjustable louvers is provided, for regulating the flow of hot air to various of the superposed conveyers; and a fan can blow cooling air horizontally across certain of the conveyers.

6 Claims, 3 Drawing Figures

DRYING APPARATUS

The present invention relates to apparatus for drying certain fruits or vegetables while moving them in an oven.

Known apparatus which is in most instances used for the drying of fruit, comprises generally an odd number of horizontal endless belt conveyors that are vertically superposed and staggered so as to feed each to the next lower conveyor. The products to be dried thus move in an enclosure in which they are subjected alternately to currents of hot air and to currents of cold air directed transversely of the conveyors by fans.

However, such apparatus ordinarily does not permit homogeneous drying of the material, principally because of differences in size of the fruit, for example, which is being treated. At the same time, their operation involves a large consumption of energy to compensate for heat losses.

It is accordingly an object of the present invention, to provide such apparatus which provides for uniform drying and also provides an economical control of drying temperatures, while permitting modulation of the speed of circulation of the material in the oven.

To this end, the apparatus according to the present invention is comprised by feed means permitting feeding of the products to be dried, simultaneously on two endless belts at the top of the apparatus. This arrangement offers the possibility of selective feeding according to the size of, for example, fruits to be dried, and moreover ensures a high and regular production rate from the apparatus and enables initial drying to be conducted at the maximum capacity of the apparatus. This is particularly advantageous in the case of fruits and vegetables subjected to drying, which lose the greatest part of their retained water at the outset of drying.

Apparatus according to the present invention also comprises blower mechanism having deflectors and provision for recycling drying air, whose arrangement in a plane perpendicular to the planes of the belts permits attaining a longitudinal circulation of drying air relative to the belts, in other words, directly on the products carried by the belts. Use of such equipment substantially reduces heat loses that have plagued known driers, in which the movement of drying air takes place perpendicularly to the direction of movement of the belts.

Other objects, features and advantages of the present invention will become apparent from a consideration of the following description, taken in connection with the accompanying drawings, showing an installation for the drying of plums in the production of prunes, and in which.

Figure 1:
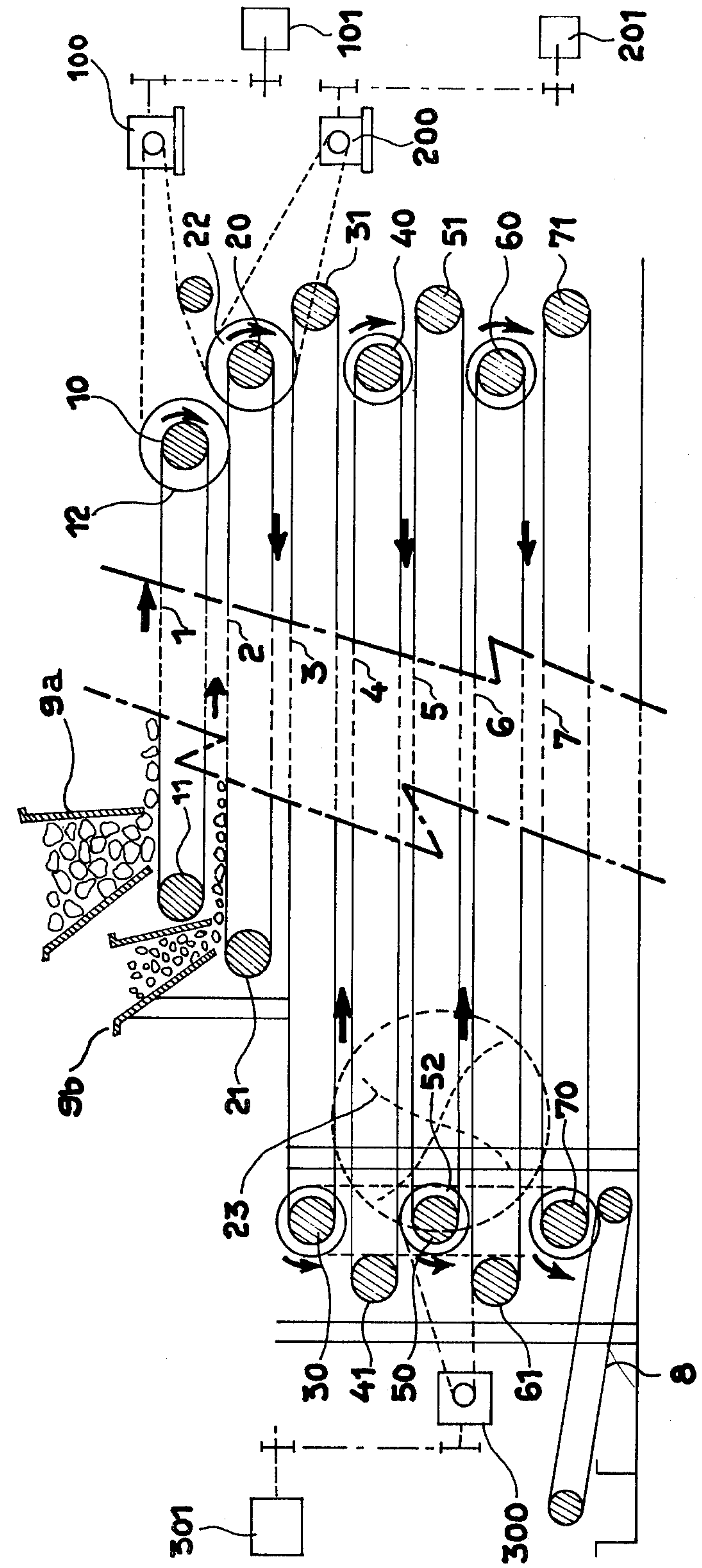
FIG. 1 is a schematic side elevational view of apparatus according to the present invention adapted to be enclosed in a casing or oven or tunnel.

Referring now to the drawings in greater detail, and first to the schematic showing of FIG. 1, it will be seen that the apparatus according to the present invention is comprised principally of seven endless belt conveyors disposed in superposed staggered relationship thereby to feed material to be dried downwardly successively from belt to belt, and finally to a discharge conveyer 8.

These conveyers are preferably fixed in position, which facilitates their maintenance and enables their installation into existing drying tunnels or ovens.

The endless belts are carried by rollers, of which the rollers 10, 20, 30 . . . 70 are power driven and the rollers 11, 21, 31 . . . 71 are idle.

Belts 2, 4 and 6 are driven in the same direction by a power driven pulley 22 secured to drive pulley 20 and driven by a motor 200, the pulley 22 transmitting by means by a chain the circulatory movement which drives the rollers 40 and 60.

The same drive mechanism is used for belts 3, 5 and 7 which move countercurrent to belts 2, 4 and 6. Driven rollers 30 and 70 are coupled to the drive roller 50 whose power driven pulley 52 is driven by motor 300.

Belt 1 is driven independently of all the other belts by a motor 100 which rotates pulley 12 secured to drive roller 10 in the same direction as drive pulley 22.

The drive means for the various belts of the present invention permits obtaining different speeds for different belts. Thus, belt 1 which has its own drive means, may be driven at a speed substantially less than that of belt 2, although in the same direction as belt 2.

Each motor 100, 200 and 300 is provided with a respective speed reducer and speed change mechanism 101, 201, and 301, respectively, which permits regulating the speed of travel of the belts thereby to control the residence time of the fruits and vegetables in the oven.

To this end, the control panel (not shown) for the motors is provided with a timer which for example can drive the motors from 0 to 100% of the time at intervals of, say, 3 seconds, whereby the total residence time of the material on the belts can be as long as, say, 100 hours.

The material is fed to the apparatus by means of two hoppers *9a* and *9b* respectively disposed at the feed end of each of the belts 1 and 2. Thus, belt 1 whose speed may be for example less than that of belt 2, could be fed with large-sized fruits by hopper *9a;* while belt 2 could be fed with small-sized fruits by hopper *9b*.

The smaller fruits would thus be subjected to a first period of drying which is of shorter duration than that for the large-size fruits. The residence time of the small fruits in the oven might be, for example, from 3 to 30 minutes less than that of the larger fruits.

After their movement on their respective belts 1 and 2, the fruits are fed to the next lower belt 3 and successively to the next lower belts, in alternately opposite directions as indicated by the arrows in FIG. 1, and finally to belt 8.

By somewhat altering the drive means and for example disposing the hopper *9b* at the other end of belt 2, it would be possible to drive belts 1 and 2 countercurrent to each other and thus prolong the path followed by the material supplied by hopper *9a*. In this and other ways, the present invention permits subjecting the maximum number of, say, pieces of fruit to the first stage of drying.

In this connection, it will of course be understood that either or both of the belts 1 and 2 can receive fruits or other material of mixed sizes, in which case the materials in hoppers *9a* and *9b* of course will not be segregated as to size.

Figure 2:
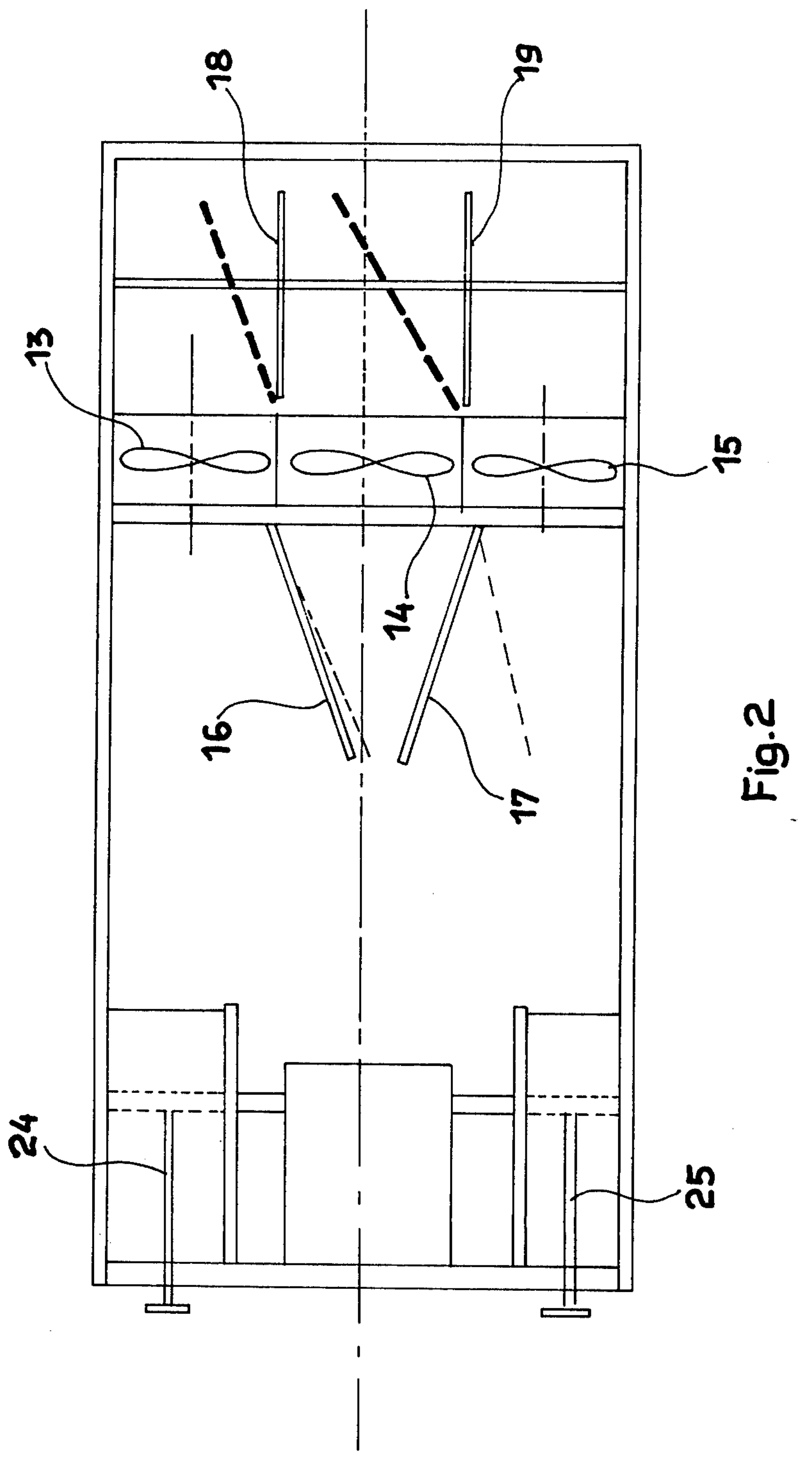
FIG. 2 is a schematic side elevational view of the blower mechanism of the present invention, viewed in the same direction as FIG. 1.

Turning now to FIG. 2, the blower mechanism is shown which is important to the proper drying of the materials according to the present invention. Comparing FIGS. 2 and 3, the former being a side elevation view as in FIG. 2 and the latter a top plan view, it will be noted that the blower apparatus is disposed parallel to and on one side of the assembly of belts. Alternatively, the blower assembly could be disposed above or below the assembly of belts.

Figure 3:
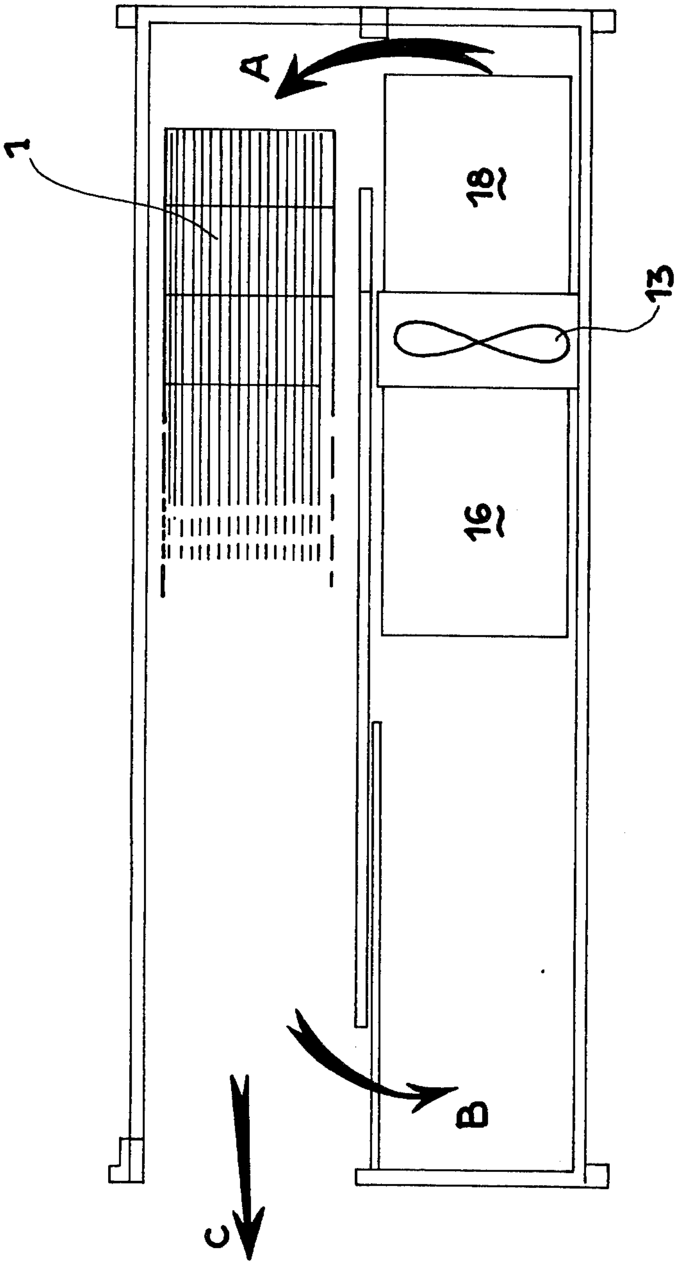
FIG. 3 is a schematic top plan view of apparatus according to the present invention, showing particularly the directions of air flow.

In the illustrated embodiment, there is a battery of three fans, 13, 14 and 15 disposed one above the other in a plane perpendicular to the belts and directing air in the direction of the arrow A of FIG. 3, which air is heated by any known means (not shown). The air thus passes longitudinally of the belts in direct contact with the material on the belts.

Pivotally mounted louvers 16, 17, 18 and 19 are provided on opposite sides, that is, upstream and downstream, of the fans 13, 14 and 15, so as to permit directing the current of hot air toward various levels of the stack of belts. In this way, the drying temperatures encountered by the material as it traverses the various belts, can be varied as desired. In this way, for example, the temperature on belts 1, 2 and 3 might be, say, 90° C. for the first drying phase. On belts 4 and 5, the temperature can be, say, between 60° C. and 90° C. for stabilization purposes; and on belts 6 and 7, a maximum temperature of 72° C. can be maintained, corresponding to the last portion of the drying cycle.

A ventilating fan 23, shown in broken line in FIG. 1, can also be provided, whose axis is horizontal and perpendicular to the length of the belts, so as to blow cold air over portions of belts 3, 4, 5, 6 and 7. This has the effect of lowering the temperature of the fruit or other material after the first phase of drying on belts 1 and/or 2 and 3, during which first phase a great deal of water content has been removed, with a concentration of retained water near the outer periphery of the fruits or other objects.

This cooling of the fruit also permits migration of water toward the periphery of the items to be dried, before they are again subjected to the current of hot air.

Finally, it will be noted that other dampers or louvers 24 and 25 permit recycling hot air according to the arrow B in FIG. 3, or for the discharge of moisture-laden vapors according to the arrow C in FIG. 3, according to the amount of humidity in the drying air after it has left the belts.

By the practice of the present invention, a maximum amount of water can be removed in a minimum amount of time; and for the particular example of plums being dried to prunes, about 30% of the water has been removed in a period of two hours.

From a consideration of the foregoing disclosure, therefore, it will be evident that initially recited objects of the present invention have been achieved.

Although the present invention has been described and illustrated in connection with preferred embodiments, it is to be understood that modifications and variations may be resorted to, as those, skilled in this art will readily understand. Such modifications and variations are considered to be within the purview and scope of the present invention as defined by the claims.

What is claimed is:

1. Drying apparatus comprising a plurality of vertically superposed horizontal endless belts disposed in a drying oven and feeding from one to the other in a downward direction, and means for separately feeding material to be dried to the two uppermost belts.

2. Apparatus as claimed in claim 1, said feed means comprising a hopper individual to each of the two top belts.

3. Apparatus as claimed in claim 1, and means for driving the two upper belts at different velocities.

4. Apparatus as claimed in claim 1, both of said two uppermost belts feeding to the third belt from the top.

5. Apparatus as claimed in claim 1, in which the two uppermost belts are driven in the same direction.

6. Apparatus as claimed in claim 1, in which the two uppermost belts are driven countercurrent to each other.

* * * * *